United States Patent Office 3,180,872
Patented Apr. 27, 1965

3,180,872
HALOGEN SUBSTITUTED ETHYL AND VINYL PYRIDINES
James E. Cochran, Jr., Indianapolis, Ind., Granville B. Kline, Toronto, Ontario, Canada, and Quentin F. Soper, Indianapolis, and William N. Cannon, Greenwood, Ind., assignors to Eli Lilly and Company, Indianapolis, Ind., a corporation of Indiana
No Drawing. Original application July 25, 1960, Ser. No. 44,898, now Patent No. 3,105,005, dated Sept. 24, 1963. Divided and this application Jan. 22, 1963, Ser. No. 253,071
4 Claims. (Cl. 260—290)

This invention relates to novel pyridine compounds. More particularly it relates to novel halogen-containing pyridine compounds and to the use thereof as nematocidal agents in agricultural soils.

Nematodes are found in temperate and tropical regions in all types of soil at depths ranging up to five feet or more below the surface of the ground. It is difficult to control the nematode population, particularly in soils used for agricultural purposes, because of the exacting requirements for an effective nematode control agent. For example, the ideal nematocidal agent should be toxic to the nematode upon absorption or contact; it must be essentially nontoxic to the plant life grown in the same soil; and it should persist in the soil for a considerable period of time. Meeting this last requirement is particularly difficult since the chemical employed as a nematocide must thus be not only relatively nonvolatile but also resistant to microbial degradation. Most of the nematocidal compounds of the prior art have been halogenated hydrocarbons of the type commonly used as fumigants. These compounds, although effective, have had several disadvantages, among which have been a substantial toxicity for both plant and animal life and an excessively high vapor pressure, limiting their persistence in the soil.

This application is a division and continuation-in-part of our co-pending application Serial No. 44,898, filed on July 25, 1960, now Patent No. 3,105,005.

It is an object of this invention to provide a new class of pyridine compounds and methods for their preparation. A further object of this invention is to provide new halogen-containing pyridines useful for the control of nematodes.

In fulfillment of the above and other objects, this invention provides novel halogen-containing pyridine bases having the following structural formula:

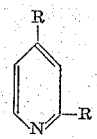

wherein one R is a radical of the group consisting of

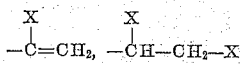

and —$CX_2$—$CH_2X$, and the other R is hydrogen; and X is bromine or chlorine. Also included within the scope of this invention are acid addition salts of the pyridine bases represented by the above formula.

Illustrative pyridine bases and their salts include the following compounds: 2-(α-chlorovinyl)pyridine, 2-(α-chlorovinyl)pyridine hydrochloride, 4-(α-chlorovinyl)-pyridine hydrochloride, 2-(α-bromovinyl)pyridine, 2-(α-bromovinyl)pyridine hydrobromide, 2 - (α,β - dibromoethyl)pyridine, 2-(α,β-dibromoethyl)pyridine hydrobromide, 4-(α,β-dibromoethyl)pyridine hydrobromide, 2-(α,β-dichloroethyl)pyridine, 2 - (α,β - dichloroethyl)pyridine hydrochloride, 2-(α,α,β-trichloroethyl)pyridine, and 2-(α,α,β-trichloroethyl)pyridine hydrochloride.

The following acids can be employed to form other different acid addition salts of the pyridine bases included within the scope of the above formula: sulfuric, nitric, oxalic, tartaric, maleic, benzoic, succinic, chloroplatinic, and the like.

The compounds of the present invention possess distinct and unique advantages over the vinylpyridines to which the claims of our parent application relate. Their superiority may derive in part from the fact that with addition of halogen to the vinyl side chain, the ability and tendency of the pyridine compounds to polymerize is significantly reduced. In the case where two halogens are introduced into the vinyl side chain, a completely saturated side-chain radical is obtained and there is less chance for polymerization to occur. At the same time, these halogen-containing compounds tend to be less volatile than the vinylpyridines of the parent application and therefore persist in the soil for a longer period of time. Thus the compounds of the present invention possess enhanced nematocidal activity due to greater stability and persistence in the soil.

In general, a pyridine compound represented by the above formula, either in the form of the free base or as an acid addition salt thereof, is applied directly to the soil at the rate of from about 1 to about 256 lb. per acre. The compounds can be applied to the soil directly or they can be diluted with various inert solid or liquid diluents and then applied to the nematode-infested area. The preferred level of application of a nematocidal pyridine base to soils of average nematode infestation is from about 4 to about 128 lb. per acre. When an acid addition salt of a nematocidal pyridine base is used, the rate of application will, of course, depend upon the amount of base actually present, since the acids which form salts with these pyridine bases contribute little or nothing to the nematocidal activity of the base and the salts themselves are employed chiefly for ease of handling and formulating.

More specifically, the use of the pyridine compounds represented by the above formula as nematode control agents can be illustrated by the following procedure. A test soil was prepared by thoroughly mixing two parts of white-plaster sand, two parts of masonry sand and one part of masonry sand and one part of dried loam. The resulting soil mixture was sifted through a fine screen and was dampened so that the soil crumbled and rolled readily. An amount of the pyridine base or acid addition salt thereof whose activity as a nematode control agent was to be evaluated, was weighed out and placed in a clean, 4-ounce jar. To the material were added 2.5 ml. of hydrated silicon dioxide as a carrier, and the test compound and carrier were mixed carefully. One hundred grams of the previously prepared soil were then added to the jar, and the jar was rolled for about 30 minutes to insure thorough mixing. Five milliliters of a nematode inoculum in the form of macerated galls and egg masses from cucumber roots infected with Meloidogyne incognita (southern root-knot nematode) were added to the treated soil in the 4-ounce jar, and the jar was again shaken to distribute the inoculum. The jar was then capped and placed on a shelf in an incubator room maintained at about 78° F. After 10 days, the jar was removed from the incubator and the treated nematode-infested soil was removed from the jar and placed in a 6-ounce, wax-coated paper cup with drainage holes punched in the bottom. Five cucumber seeds were planted in the soil, which was then watered. The wax-coated paper cup was placed in a greenhouse provided with 80° F. bottom heat under fluorescent lights for a period of 14 days, watering being provided as necessary. At the end of the 7th day following planting of the seed, the cup was checked, and if no seedlings were evident, five additional seeds were planted. At the end of the 24th day following the initial seeding, the seedlings were removed from the soil and their roots examined for nematode galls. Disease ratings were given according to the number of nematode galls and severity of the infection. Control jars containing no nematocide and control jars containing commercially available nematocides were also subjected to the identical test. Chart I, which follows, gives the results of these tests. In the chart, column 1 gives the name of the compound under test; column 2, the plant disease rating at an application rate of 256 lb. per acre; and columns 3, 4, 5 and 6, the disease ratings corresponding to application rates of 128, 64, 32, and 16 lb. per acre, respectively. The following rating scale was employed: rating of 1—severe disease indistinguishable from the untreated control; rating of 2—moderately severe disease; rating of 3—moderate disease; rating of 4—slight disease; and rating of 5—no disease.

CHART I

| Name | Disease Ratings at lb./acre | | | | |
|---|---|---|---|---|---|
| | 256 | 128 | 64 | 32 | 16 |
| 2-(α-chlorovinyl)pyridine hydrichloride | 5 | 5 | 5 | 5 | 5 |
| 2-(α,β-dichloroethyl)pyridine hydrochloride | ¹5 | ¹5 | 5 | 5 | 5 |
| 2-(α,α,β-trichloroethyl)pyridine hydrochloride | | 3.5 | 1 | 1 | 1 |
| 2-(α-bromovinyl)pyridine hydrobromide | | 5 | 5 | 5 | 5 |
| 2-(α-α-β-trichloroethyl)pyridine | | 4 | 2 | 1 | 1 |

¹ Stunting of plants.

Certain of the compounds were further tested as nematode control agents by the method outlined above, but lower rates of application were employed. Chart II, which follows, gives the results of these additional tests.

CHART II

| Name | Disease Ratings at lb./acre | | |
|---|---|---|---|
| | 8 | 4 | 2 |
| 2-(α,β-dichloroethyl)pyridine hydrochloride | 4.8 | 2.7 | 1 |
| 2-(α-chlorovinyl)pyridine hydrochloride | 5 | 5 | 3.2 |
| 2-(α-bromovinyl)pyridine hydrobromide | 5 | 4.6 | 1 |

When employed in the fields, the compounds of this invention can be injected directly into the nematode-infested soil by the methods commonly in use with the more volatile, fumigant type of nematocidal agents. Thus, the liquid free bases can be distributed as such to the infested area at depths up to 12 or even 24 inches below the soil level by injection or drilling techniques. Water solutions of the acid addition salts of free bases represented by the above formula can also be distributed to the nematode-infested soil in the same way. In applying the free bases to an infested area by the above methods, solvents such as kerosene can be used if desired for easier handling. The liquid free bases can also be distributed to a namatode-infested area by absorbing the free bases onto a solid carrier and distributing this formulation broadcast. The carrier having the free base absorbed thereon is then disked or plowed into the ground so as to facilitate contact with the nematode habitat. The acid addition salts of the free bases represented by the above formula can, of course, also be spread as such upon the infested area either as solids or as aqueous solutions, or can be mixed with an inert solid diluent, and the mixture can be distributed and mixed with soil as previously set forth. For use with greenhouse soils, the methods of mixing the nematocidal agent with the soil previously set forth in the description of the evaluation procedures can be used.

Among the inert diluents which can be mixed with solid compounds coming within the scope of the above formula, are fertilizers, irrigation water, and the like.

In addition to the tests already described, two of the compounds represented by the above formula were field teseted against the root-knot nematode, *Meloidogyne acrita*, in a commercial cantaloupe field. To the field, prepared by usual agricultural methods, the nematocide in aqueous solution, was applied as a spray and immediately incorporated into the soil with a cultivator, or the nematocide was applied as spreadable granules and plowed into the soil as set forth above.

Results of the tests are shown in Chart III which follows. In the chart, column 1 gives the name of the compound under test and the method of application, spray (S) or granules (G); columns 2, 3, 4, and 5, the disease ratings corresponding to application rates of 60, 40, 20, and 10 lb. per acre, respectively. A rating scale of from 0=no infestation to 10=100 percent infestation, was used.

CHART III

| Name | Disease Ratings at lb./acre | | | |
|---|---|---|---|---|
| | 60 | 40 | 20 | 10 |
| 2-(α-chlorovinyl)pyridine hydrochloride (S) | 3.8 | | 5.5 | |
| 2-(α,β-dichloroethyl)pyridine hydrochloride (S) | 4.4 | 2.2 | 2.6 | 6.2 |
| 2-(α,β-dichloroethyl)pyridine hydrochloride (G) | 1.5 | 2.5 | 5.2 | |

Among the nematodes which can be controlled by the compounds of this invention are Endoparasitic nematodes, including both root-knot nematodes such as *Meloidogyne hapla, Meloidogyne incognita, Meloidogyne javanica,* and root lesion nematodes such as *Pratylenchus vulnis, Pratylenchus zeae, Radopholus similis, Tylenchulus semipenetrans,* as well as Ectoparasitic nematodes, including sting nematodes such as *Belonolaimus gracilis, Cacopaurus pestis,* and dagger nematodes such as *Xiphinema* species.

The halogen-containing compounds of the present invention can be readily prepared from commercially available 2-vinyl or 4-vinylpyridine, as the case may be. For example, the hydrochloride addition salt of 2-vinylpyridine is prepared in a conventional manner. This salt is treated in dry chloroform solution with a solution of chlorine in dry chloroform at about 0° C., then slowly warmed to room temperature, yielding 2-(α,β-dichloroethyl)pyridine hydrochloride. The same procedure, with bromine substituted for chlorine as the halogenating agent, yields 2-(α,β-dibromoethyl) pyridine hydrochloride.

Selective dehalogenation of 2-(α,β-dichloroethyl)pyridine and 2-(α,β-dibromoethyl)pyridine by refluxing the free bases individually with anhydrous ethanol for about 5 hours yields 2-(α-chlorovinyl)pyridine hydrochloride and 2-(α-bromovinyl)pyridine hydrobromide, respectively.

Preparation of 2-(α,α,β-trichloroethyl)pyridine hydrochloride can be accomplished by treating the dry chloroform solution of 2-(α-chlorovinyl)pyridine hydrochloride with a solution of chlorine in dry chloroform at about 0° C., then slowly warming to room temperature and concentrating to dryness to yield the solid 2-(α,α,β-trichloroethyl)pyridine hydrochloride.

Preparation of the novel compounds of the invention is illustrated by the following specific examples.

*Example 1*

2-(α,β-DICHLOROETHYL)PYRIDINE HYDROCHLORIDE

Two hundred grams of 2-vinylpyridine were dissolved in 1000 ml. of ether. Anhydrous gaseous hydrogen chloride was passed through the solution, thus forming 2-vinylpyridine hydrochloride, which precipitated and was collected by filtration. Two hundred grams of 2-vinylpyridine hydrochloride thus prepared were dissolved in 1200 ml. of anhydrous chloroform. A solution comprising 142 g. of chlorine in 2000 ml. of anhydrous chloroform was prepared by adding the chlorine to the chloroform solution with cooling in a Dry Ice-ethanol bath. The chlorine solution was added to the 2-vinylpyridine hydrochloride solution while maintaining the temperature at about 0° C. The addition required about one hour. After the addition of the chlorine solution had been completed, the reaction mixture was allowed to slowly come to ambient room temperature, at which temperature it was allowed to remain for about 14 hours. The reaction mixture was filtered and the filtrate containing 2-($\alpha,\beta$-dichloroethyl) pyridine hydrochloride prepared in the above reaction was concentrated by evaporation in vacuo until crystals of 2-($\alpha,\beta$-dichloroethyl)pyridine hydrochloride had begun to form. The concentrate was cooled and the crystals were collected by filtration and were dried. 2-($\alpha,\beta$-dichloroethyl)pyridine hydrochloride thus prepared melted at about 125–126.5° C.

*Analysis.*—Calc.: N, 6.59. Found: N, 6.43.

Example 2

2-($\alpha,\beta$-DIBROMOETHYL)PYRIDINE HYDROCHLORIDE

Following the procedure of Example 1, 62.4 g. of bromine in 200 ml. of anhydrous chloroform were added to a solution comprising 50 g. of 2-vinylpyridine hydrochloride in 300 ml. of anhydrous chloroform while maintaining the temperature between 0 and 2° C. After the addition had been completed, the reaction mixture was stirred for about 4 hours with the temperature rising only to about 16° C. At the end of this time, the reaction mixture consisted of two distinct phases, an upper, yellow phase and a lower, red phase. The two phases were separated and eventually evaporated to dryness in vacuo. Both phases yielded a red, taffy-like solid. In each instance, the taffy-like solid was dissolved in hot, anhydrous ethanol and the ethanol solution was chilled at about 0° C. for 24 hours. Both ethanol solutions yielded crystalline 2-($\alpha,\beta$-dibromoethyl)pyridine hydrochloride, which melted at about 143–145.5° C. after a second recrystallization from anhydrous ethanol.

*Analysis.*—Calc.: C, 27.89; H, 2.67; N, 4.65. Found: C, 28.01; H, 3.03; N, 4.62.

Example 3

2-($\alpha$-CHLOROVINYL)PYRIDINE HYDROCHLORIDE

Thirty grams of 2-($\alpha,\beta$-dichlorovinyl)pyridine hydrochloride were dissolved in 100 ml. of water and 11.9 g. of sodium bicarbonate were added, thus forming the free base of 2-($\alpha,\beta$-dichlorovinyl)pyridine. The free base was insoluble in the alkaline solution and was extracted with 150 ml. of ether. The ether solution was separated and was dried. An aliquot of the dried ether solution containing 10 g. of 2-($\alpha,\beta$-dichlorovinyl)pyridine in 100 ml. of ether was evaporated to dryness in vacuo. Twelve milliliters of anhydrous ethanol were added, and the mixture was heated at refluxing temperature for about 5 hours. The reaction mixture was slowly cooled to ambient room temperature and was then chilled to about 0° C. A crystalline precipitate of 2-($\alpha$-chlorovinyl)pyridine hydrochloride precipitated during this time and was separated by filtration. Addition of ether to the filtrate yielded an additional crop of crystals of the same compound. The two crops of crystals were combined and were recrystallized from anhydrous ethanol. The product, 2-($\alpha$-chlorovinyl)pyridine hydrochloride, melted at about 138–143° C.

*Analysis.*—Calc.: N, 7.96. Found: N, 7.60.

Example 4

2-($\alpha$-CHLOROVINYL)PYRIDINE HYDROCHLORIDE

The procedure of Example 3 was repeated using an aliquot of the ethereal solution of the free base containing 5 g. of 2-($\alpha,\beta$-dichlorovinyl)pyridine in 50 ml. of ether, except that the free base was mixed and heated for 2 hours with 2.8 g. of triethylamine instead of with anhydrous ethanol as in that example. After the heating period, 100 ml. of ether were added to the reaction mixture, and triethylamine hydrochloride, a by-product of the above reaction, was removed by filtration. The ethereal filtrate containing the free base of 2-($\alpha$-chlorovinyl)pyridine formed in the above reaction was treated with anhydrous gaseous hydrogen chloride. The 2-($\alpha$-chlorovinyl)pyridine hydrochloride thus formed was separated by filtration, was recrystallized from anhydrous ethanol and melted at about 139–143° C.

Example 5

2-($\alpha$-BROMOVINYL)PYRIDINE HYDROBROMIDE

Following the procedure of Example 3, 10 g. of 2-($\alpha,\beta$-dibromoethyl)pyridine hydrochloride were dissolved in water, the water solution was made basic with sodium bicarbonate, and the 2-($\alpha,\beta$-dibromoethyl)pyridine free base thus formed was extracted into ether. The ether extract was separated and was dried. Evaporation of the ether in vacuo yielded a residue comprising 2-($\alpha,\beta$-dibromoethyl)pyridine free base which, upon remaining at ambient room temperature for about three days, reacted intermolecularly to form a black, crystalline mass of 2-($\alpha$-bromovinyl)pyridine hydrobromide. Recrystallization of the crystalline mass from anhydrous ethanol yielded 2-($\alpha$-bromovinyl)pyridine hydrobromide melting at about 150–153° C.

*Analysis.*—Calcd.: Br, 60.32; N, 5.29. Found: Br, 60.93; N, 5.27.

Example 6

2-($\alpha,\alpha,\beta$-TRICHLOROETHYL)PYRIDINE HYDROCHLORIDE

Four grams of 2-($\alpha$-chlorovinyl)pyridine hydrochloride were dissolved in 30 ml. of anhydrous chloroform. A solution containing 7.2 g. of chlorine in 50 ml. of anhydrous chloroform was prepared by adding the chlorine to the chloroform being cooled in a Dry Ice-ethanol bath. The chlorine solution was added to the chlorovinylpyridine solution while maintaining the temperature between 0 and 4° C., the mixture was stirred for about 2 hours while being maintained in the same temperature range, and was then allowed to remain overnight at ambient room temperature. Evaporation of the reaction mixture to dryness in vacuo yielded 2-($\alpha,\alpha,\beta$-trichloroethyl)pyridine hydrochloride as a cream-colored solid. The compound melted with decomposition at about 128–129° C. after two recrystallizations from anhydrous ethanol.

*Analysis.*—Calc.: N, 5.67. Found: N, 6.00.

Salts of pyridine bases represented by the above formulas are prepared by dissolving one equivalent of the base in ether or an alcohol and adding thereto an equivalent amount of the acid as an ethereal or aqueous solution, depending upon the solubility of the acid. The acid addition salt is then recovered either by evaporation of the solvent or by simple filtration if the acid addition salt is insoluble in the reaction solvent.

The preparation of salts of pyridine bases with volatile acids is illustrated in Example 4.

Other novel compounds represented by the above formulas can be prepared by suitable adaptation of the procedures set forth above.

We claim:

1. A substance of the class consisting of the pyridine bases represented by the following formula,

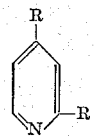

wherein one R is a member of the group consisting of

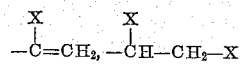

and $-CX_2-CH_2X$, and the other R is hydrogen; and X is a member of the group consisting of chlorine and bromine; and the acid addition salts thereof.
2. 2-(α-chlorovinyl)pyridine.
3. 2-(α-bromovinyl)pyridine.
4. 2-(α,β-dichloroethyl)pyridine hydrochloride.

References Cited by the Examiner
UNITED STATES PATENTS
3,105,005   9/63   Cannon et al. _____ 167—33

OTHER REFERENCES

Alberts et al. "Journal of the American Chemical Society," vol. 57 (1935), pp. 1284–1287.

IRVING MARCUS, *Primary Examiner.*

NICHOLAS S. RIZZO, *Examiner.*